Dec. 26, 1933.  T. J. STEPHENS  1,940,889
BAKER'S OVEN AND MEANS FOR CONTROLLING AND DISTRIBUTING
THE PRODUCTS OF COMBUSTION THROUGHOUT THE SAME
Filed Jan. 31, 1933  4 Sheets-Sheet 1
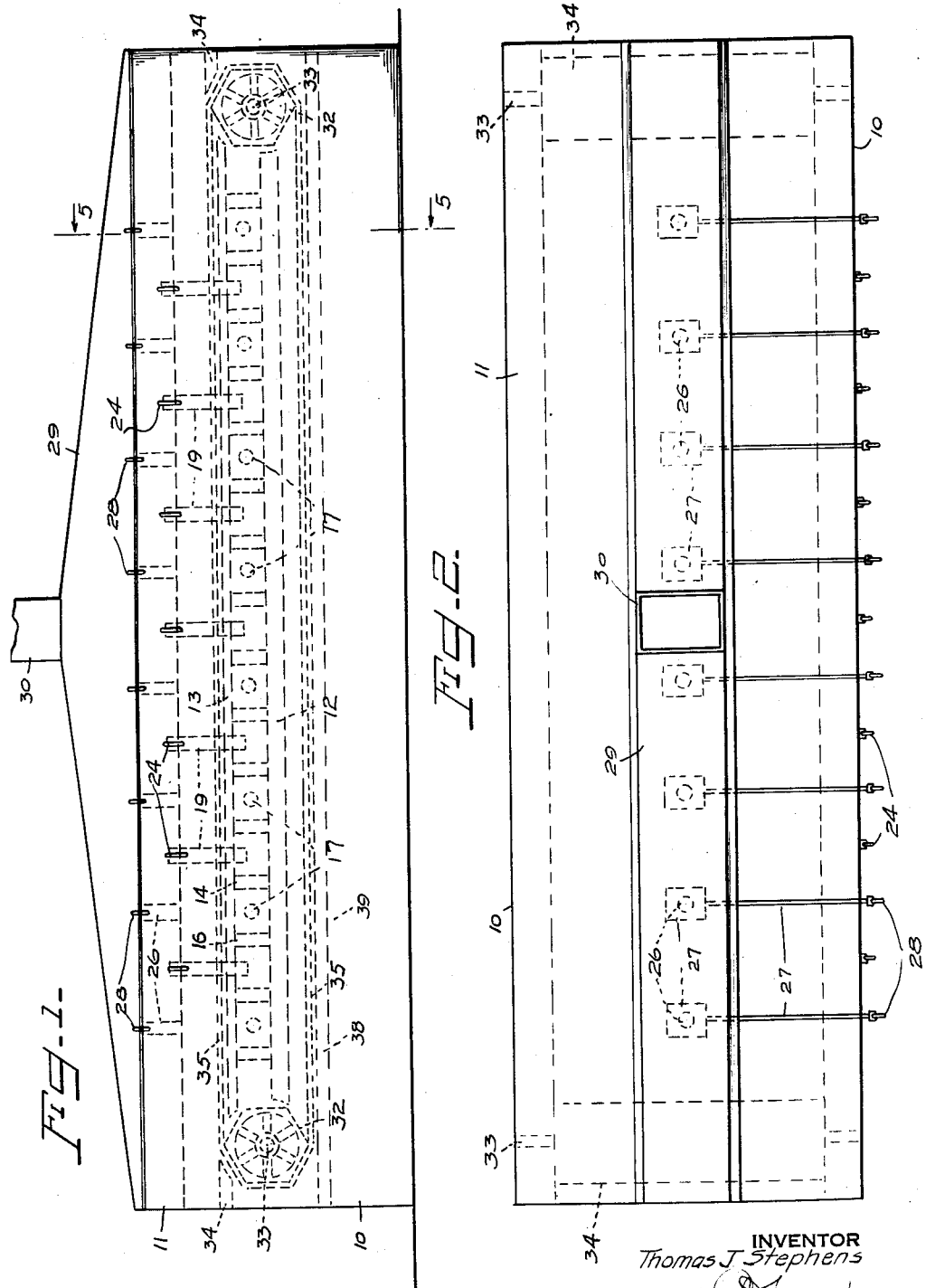
INVENTOR
Thomas J. Stephens
BY
his ATTORNEY

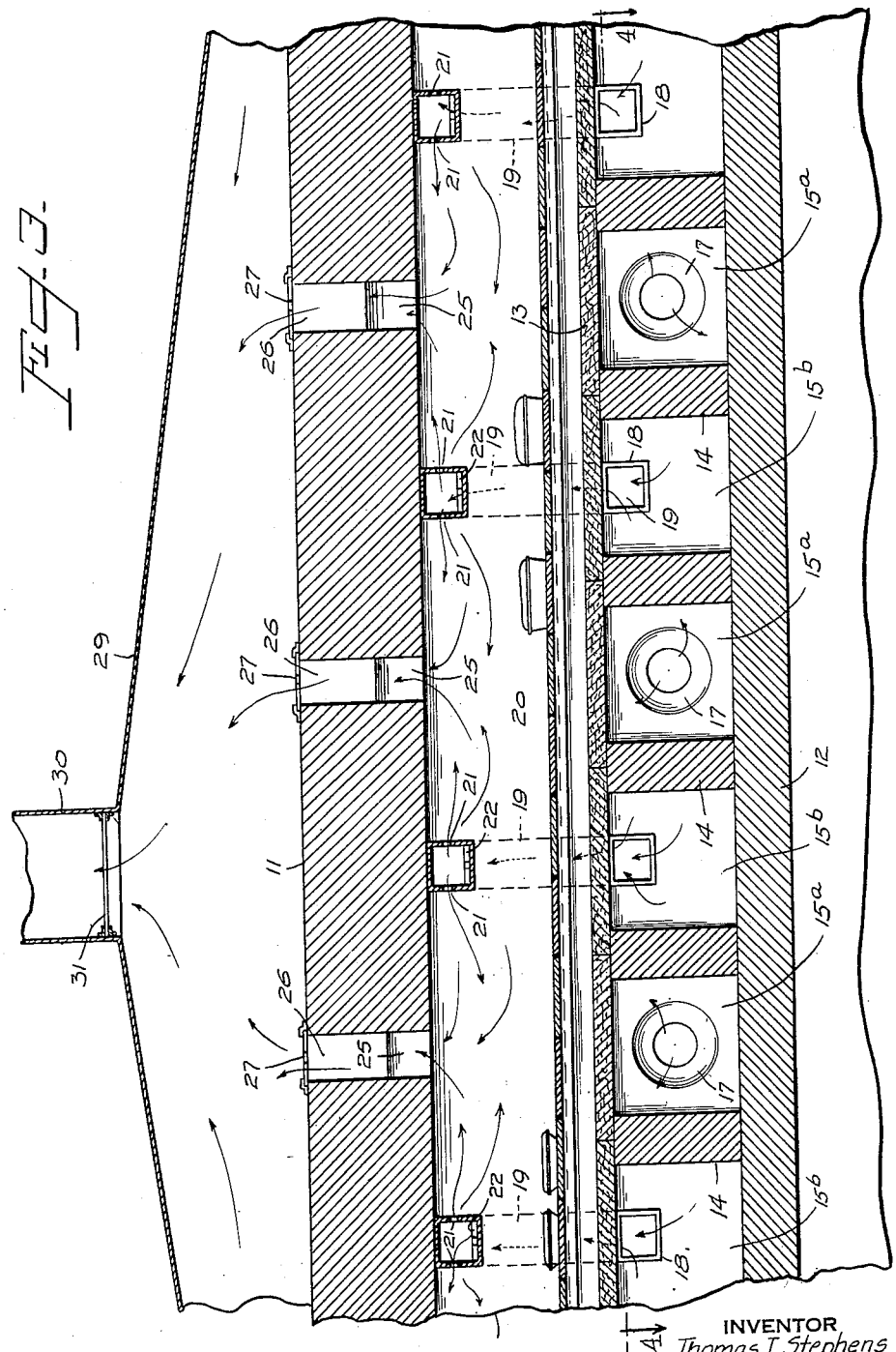

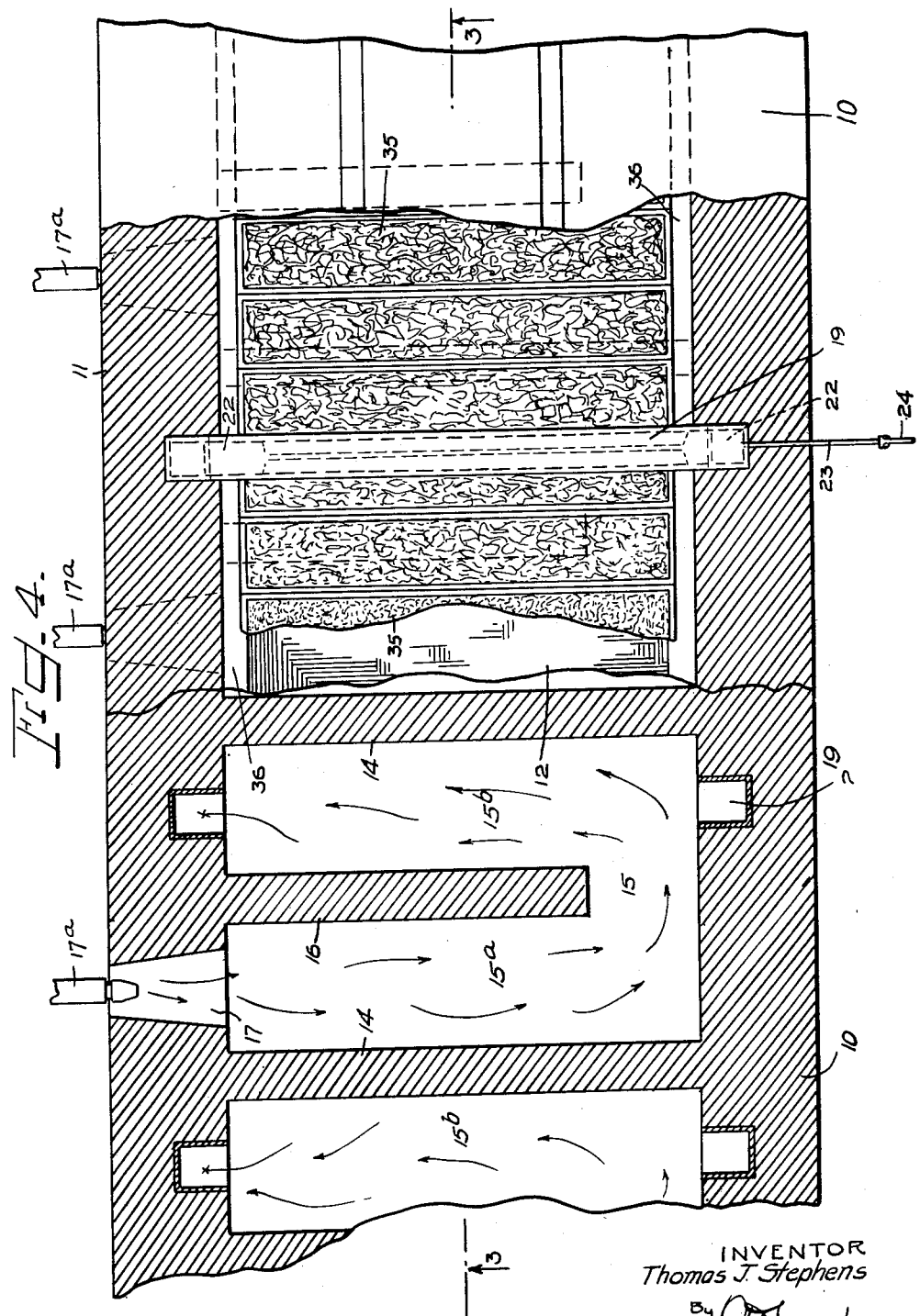

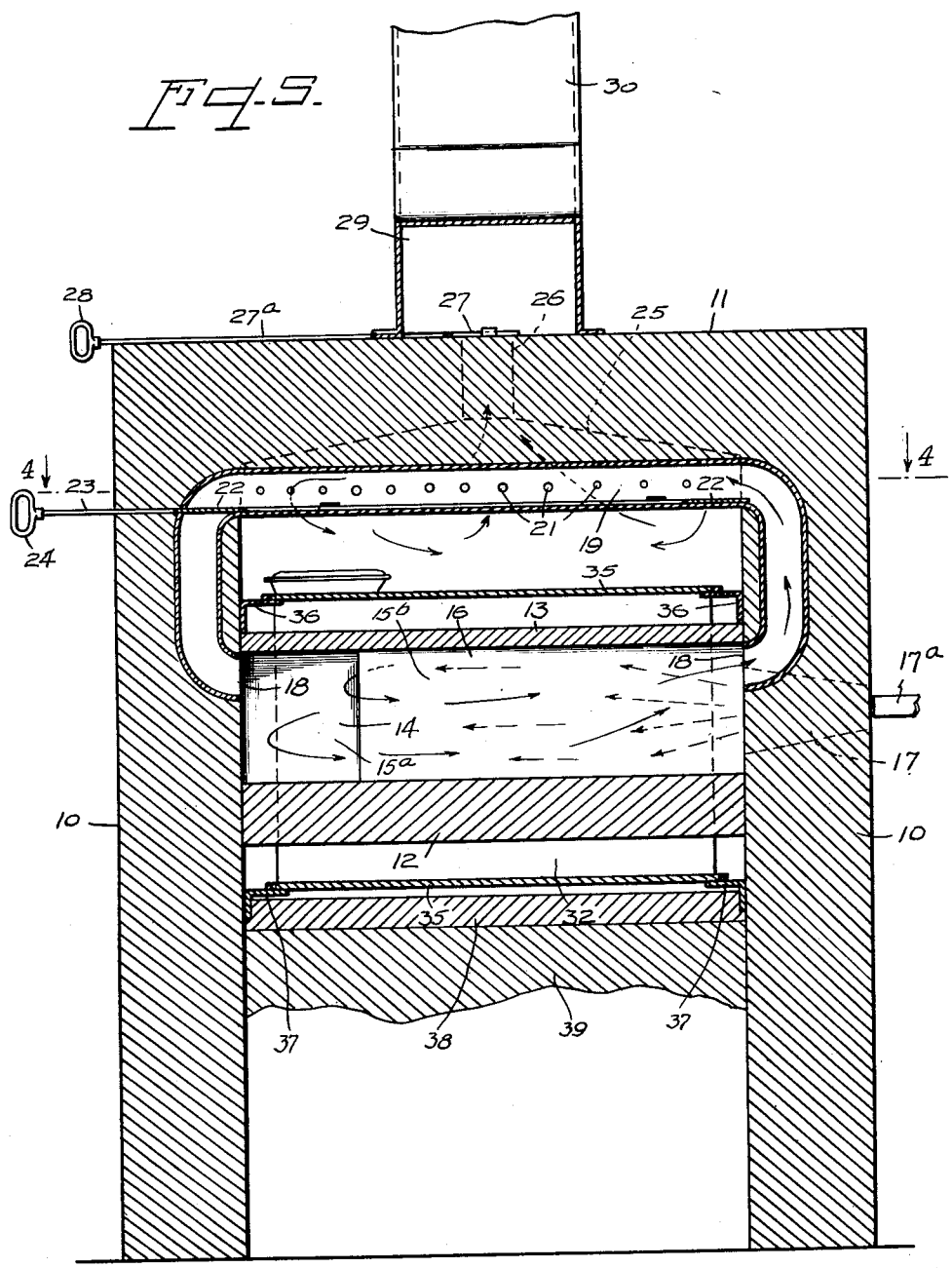

Patented Dec. 26, 1933

1,940,889

UNITED STATES PATENT OFFICE 1,940,889

BAKER'S OVEN AND MEANS FOR CONTROLLING AND DISTRIBUTING THE PRODUCTS OF COMBUSTION THROUGHOUT THE SAME

Thomas J. Stephens, Brooklyn, N. Y.,

Application January 31, 1933. Serial No. 654,392

5 Claims. (Cl. 107—57)

This invention relates to baker's ovens and especially to improvements in the method of, and means for controlling distribution of products of combustion or other heat-laden gases, functioning as a heat vehicle, through said oven.

The present invention is particularly pertinent to ovens of the continuous movable hearth type, and one of its objects is to provide a method for, and means by which ovens of this type which have been originally constructed for the use of gaseous fuel can be practicably and without relatively great expense converted to be heated by the use of fuel oil.

Another object of the invention is to provide a method for, and means adaptable to, adjustment of temperature conditions in the several interior localities of the oven, whereby strong bottom heat and relatively weak top heat, or balanced bottom and top heat, or weak bottom and relatively strong top heat can be produced independently at numerous longitudinal intervals along the oven, by manipulation of dampers controlling the flow of heat in each longitudinal section independently of other such sections.

The objects of this invention are accomplished by means of the several steps of the method hereinafter fully described, coupled with the several novel features of the oven design and construction illustratively exemplified in the accompanying drawings, in which, Figure 1 is an elevational view of a complete oven constructed in accordance with the present invention; Figure 2 is an elevational top plan of same; Figure 3, is a substantially longitudinal sectional view taken on line 3—3 of Figure 4; Figure 4 comprises two fragmentary substantially longitudinal sectional plan views, one taken on line 4—4 of Figure 3 and the other taken on line 4—4 of Figure 5; and Figure 5 is a substantially transverse sectional elevational view taken on line 5—5 of Figure 1.

The several steps of procedure in practicing my improved method of heat distribution and application to articles which are to be baked, will be best understood when considered in connection with apparatus by means of which the method can be carried into effect.

In the accompanying drawings, 10 designates the upright longitudinal front and back walls of an oven, and 11 the top wall. At an elevation which may be substantially midway between the floor line and top 11 of the oven is disposed the bottom 12 of the oven proper, and substantially midway of the bottom 12 and the top 11 as a stationary hearth 13, the latter as well as the bottom 12 extending approximately throughout the entire length of the oven proper, as illustrated in Figure 1. At spaced intervals throughout the length of the space between 12 and 13 are upright partitions 14 which separate said space into a plurality of individual combustion or heat receiving chambers 15. Each combustion chamber 15 (Figure 4) is provided with an upright partition 16 which extends from the front wall 10 and terminates substantially short of the back wall 10 of the oven, as illustratively exemplified particularly in Figure 4, thus dividing each said chamber into a primary heat receiving compartment 15ª and a secondary heat receiving compartment 15ᵇ. At one side of the partition 16, and extending through the front wall into communication with the primary heat receiving compartment of chamber 15, is formed an admission port 17 into which any appropriate heat-laden gaseous heat vehicle may be delivered, or through which a flame may be projected. In the latter case the products of combustion will comprise the necessary heat-laden vehicle or some part thereof. At each end of each compartment 15ᵇ there is an opening 18, disposed just under the hearth 13 and communicating with the opposite ends of an inverted U-shaped pipe or conduit 19. The upright arms of the conduit 19 are placed in the front and rear walls 10 of the oven, and the lateral, mid-portion of the conduit extends transversely through the upper part of the baking chamber partly in or beneath the top 11 of the oven as shown in Figure 3.

The walls of the mid-portion of the conduits 19 are provided with openings 21 through which the heat-laden gases carried upwardly from either end of compartments 15ᵇ are delivered into the baking chamber 20. A double damper 22 is arranged in the lateral portion of each conduit 19, as illustrated in Figure 5, and comprises a rod 23 slidably mounted in either wall 10 and provided with a hand grip 24 at the outer end, the opposite projection extending between the upright arms or flues of the conduit and having flat plates or dampers capable of being moved to close off either of said vertical flues from the passage of gases therethrough. The illustration in Figure 5 shows the rod 23 pulled out and passage through the vertical flue in the rear wall closed by the damper, while the flue in the front wall is open, thereby causing the heat-laden gases entering at the port 17 to traverse the entire length of compartment 15ª and return the entire length of compartment 15ᵇ before rising for distribution into the baking chamber 20 through the openings 21. When, however, the position of the slidable rod 23 is reversed, the damper in the front wall will be closed and that in the rear wall opened. With the damper in this latter position, the heat-laden gases being delivered through the port 17 will traverse the length of the compartment 15ᵃ thence through the end adjacent the rear wall of compartment 15ᵇ and rise to distribution in the baking chamber 20 through the openings 21 without having traversed the length of compartment 15ᵇ. In the case of the first damper position a strong bottom heat will be delivered to the baking articles because the maximum area of the heat radiating hearth 13 has been covered by the heat imparting medium. Likewise since a greater portion of the heat contained in the heat-laden gases when delivered through the port 17 has been imparted to the hearth 13, it follows that these gases will contain less heat when they reach the baking chamber 20 through the openings 21 than they would have contained if they had traversed the shorter path to the openings 21 which leads through the other end of the U-shaped pipe 19.

Inasmuch as the oven is divided into numerous sequential chambers 15, each of which is in turn sub-divided by the partial partition 16 into the primary and secondary compartments 15ᵃ and 15ᵇ, and each said chamber with its two compartments and communicating U-shaped conduit 19 constitutes an independent heat distributing unit, each capable of reversal as to bottom and top heat distribution, independently of other such chambers, it becomes obvious that, by adjustment of dampers together with the proper provision for delivery of heat in each combustion or heat receiving chamber, strong bottom heat and relatively weak top heat can be obtained at any heat distributing unit along the length of the oven. For example, if it is desirable that, at the loading end of the oven, strong bottom heat and relatively weak top heat, while at the central portion of the oven balanced or equal bottom heat and top heat, and along towards the unloading end, strong top and weak bottom heat should be maintained, to accomplish this adjustment, several of the damper rods near the loading end would be drawn out, along the intermediate portion of the oven, the position of the damper rods would be pushed in. Likewise any other adjustments within the temperature range provided for, whereby relative strong bottom and weak top temperatures, or vice versa, can be established along the length of the oven at intervals represented by the spaces included between the transverse walls 14.

In the wall 11, outlet openings 26 are formed in the area between each two of the conduits 19, for the discharge or exhaust of spent gases as well as vapors which are constantly eliminated from the baking articles. The upper ends of the openings or flues 26 which extend through the wall 11 are provided at the upper surface of said wall with dampers 27 having control rods 27ᵃ fitted with hand grips 28 overhanging the side of one of the walls 10. These flues 26 form communicating passageways between the top of the baking chamber 20 and an exhaust manifold 29 extending approximately the length of the oven and communicating with the chimney 30 which is representative of any means of disposal for exhaust gases.

The feeding and delivery ends of the oven are open and at each end a polygonal drum or sprocket 32 is rotatably mounted upon a driven shaft 33 disposed transversely of the space beneath the hearth 13 and wall or bottom 12. A sill plate 34 provides a platform between each drum 32 and the adjacent end of the oven. The articles to be baked in their pans are introduced into the baking chamber 20 upon a movable hearth, which consists of a series of tranverse metal bound stone plates 35, the ends of the plates being slidably supported on side rails 36 carried by the side walls 10 of the oven, these plates 35 are connected together by means of link belts carried on the sprockets or by any other adaptable method whereby a continuous traveling hearth is provided for carrying articles to be baked through the length of the baking chamber and there are a sufficient number of hearth plates to extend from one drum 32 to the other where they pass around the same being slidably carried beneath the bottom 12 on slide rails 37 anchored to the walls 10 of the oven and are connected to form a continuous traveling conveyor or hearth.

Immediately beneath the hearth 35 and throughout the extent thereof which rests upon the lower slide rails 37 a hearth 38 is constructed of refractory materials laid upon an insulating bed 39. The purpose of the hearth 38 and the insulation 39 beneath it is to enclose together with the bottom 12, a heating chamber for the movable hearth 35, whereby in its passage therethrough it will absorb heat radiated from the bottom 12, resulting in the traveling hearth being preheated preparatory to receiving the articles to be baked thereupon, before it passes into the loading end of the oven. The bottom 12 of the oven proper should be constructed in a manner, and of a thickness and of materials of proper heat conductivity to permit transmission of heat therethrough in quantity commensurate with the degree of pre-heating which is desirable for the traveling hearth 35.

Having now described my invention and the manner in which the same may be operated, what I claim as new and desire to secure by Letters Patent is:

1. A bake oven comprising a continuous baking chamber, a fixed hearth forming the bottom of said chamber, a longitudinally movable hearth traversing said baking chamber, a series of transverse heat receiving chambers arranged beneath the baking chamber and divided therefrom by the fixed hearth, a baffle wall in each heat receiving chamber extending from one end thereof to a place short of the opposite end, whereby heat-laden gases entering the chamber may follow a path extending from one side of the oven to the other side, and then back again on the opposite side of said baffle, and a conduit opening at opposite sides of the oven into each heat receiving chamber, said conduit having its mid-portion provided with openings disposed to distribute gases discharged therefrom, transversely through the oven.

2. A bake oven, as claimed in claim 1, including a damper disposed to close said conduit at either side of the oven and open it at the other side thereof.

3. A bake oven, as claimed in claim 1, in which the conduits comprise inverted U-shaped passageways disposed to transversely span, with their intermediate sections, the baking chamber above the traveling hearth, and with their legs extending downwardly into communication with the heat receiving chambers at opposite sides of the oven, the said intermediate sections of each conduit being provided with distributed openings, and a damper in each conduit designed and disposed to close same at either side of the oven and open it at the other side.

4. A bake oven, as claimed in claim 1, in which each conduit comprises an inverted U-shaped passageway with its legs beginning at opposite ends of a heat receiving chamber, and extending upwardly to unite through elbows with its intermediate section which crosses the baking chamber through the upper elevation thereof, said latter portion of the conduit within the baking chamber being provided with openings for discharging therein, connected dampers for the upright portions of the conduit whereby the flow of heat-laden gases through the conduit into the baking chamber can be admitted from either end of the heat receiving chamber and shut off from the other end, and a series of outlets intermediate the conduits in the baking chamber and a damper to open and close each outlet.

5. A bake oven, as claimed in claim 1, in which each conduit comprises an inverted U-shaped passageway begining at the ends of a heat receiving chamber, following an upright direction and then crossing the baking chamber through the upper elevation thereof, said latter portion of the conduit within the baking chamber being provided with discharge openings, a damper for the upright portions of the conduit capable of controlling the flow of heat-laden gases into the baking chamber from either one or the other end of said heat receiving chamber, a series of outlets intermediate the conduits in the baking chamber, dampers for the outlets, and a manifold into which the outlets discharge.

THOMAS J. STEPHENS.